United States Patent [19]
Archer et al.

[11] Patent Number: 6,021,457
[45] Date of Patent: Feb. 1, 2000

[54] METHOD AND AN APPARATUS FOR MINIMIZING PERTURBATION WHILE MONITORING PARALLEL APPLICATIONS

[75] Inventors: David W. Archer, Beaverton; Don Breazeal, Portland; Suresh Chittor, Beaverton; Richard J. Greco, West Linn; Wayne D. Smith; Jim Sutton, both of Portland, all of Oreg.

[73] Assignee: Intel Corporation, Santa Clara, Calif.

[21] Appl. No.: 08/893,129

[22] Filed: Jul. 15, 1997

Related U.S. Application Data

[63] Continuation of application No. 08/535,765, Sep. 28, 1995, abandoned.

[51] Int. Cl.[7] .................................................... G06F 1/04
[52] U.S. Cl. .......................... 710/260; 710/261; 710/262; 710/266; 714/2; 709/102
[58] Field of Search .................................. 710/260, 261, 710/262, 266; 709/102; 714/2

[56] References Cited

U.S. PATENT DOCUMENTS

| | | |
|---|---|---|
| 4,435,759 | 3/1984 | Baum et al. . |
| 5,313,620 | 5/1994 | Cohen et al. . |
| 5,450,349 | 9/1995 | Brown, III et al. . |
| 5,511,200 | 4/1996 | Jayakumar . |
| 5,553,292 | 9/1996 | Daly et al. . |
| 5,557,744 | 9/1996 | Kobayakawa et al. . |

*Primary Examiner*—Ayaz R. Sheikh
*Assistant Examiner*—Rupal D. Dharia
*Attorney, Agent, or Firm*—Blakely, Sokoloff, Taylor & Zafman LLP

[57] ABSTRACT

A multiprocessor system and method for minimizing perturbations while monitoring parallel applications. Perturbations due to monitoring the application are minimized by synchronizing all the nodes within the system to a very accurate global time clock such that all the nodes running the application stop and restart running the application at the same time. Within the time period bounded by the stop and restart time, all the performance monitoring data is transferred from performance monitoring data buffers to a secondary memory.

13 Claims, 8 Drawing Sheets

METHOD AND AN APPARATUS FOR MINIMIZING PERTURBATION WHILE MONITORING PARALLEL APPLICATIONS

This is a Rule 1.62 Continuation of application Ser. No. 08/535,765, filed Sep. 28, 1995, now abandoned.

BACKGROUND OF THE INVENTION

1. Field of the Invention

The present invention relates to multi-processor systems. More specifically, the present invention relates to a method and an apparatus for minimizing perturbations while monitoring application software or programs running on a multi-processor system.

2. Art Background

An application, particularly a complex application, can be optimized by monitoring its performance and improving the parts of the application that display an unsatisfactory performance. One of the categories of monitoring that can be performed on an application is event tracing. In event tracing, data is captured in time stamped records when events occur. It is not uncommon for a running program to generate hundreds or thousands of such events in a very short period of time. For large scale parallel applications, these event traces must be captured for each processor utilized by the application. The high frequency of event trace generation per processor, coupled with the potential of using a very large number of processors, results in extremely large quantities of event trace data. These event traces can quickly grow too large to keep in the processor memory and must be saved on some secondary storage medium ("secondary memory"), e.g. a hard disk.

Transmission of event trace data to the secondary memory creates a problem. If the event trace data is transmitted on the system interconnect facilities used for program-related communication, it is not uncommon for the interconnect utilization of event tracing to exceed the interconnect utilization of the program being studied. As a result, event tracing can significantly perturb the very application behavior being monitored. This outcome is unacceptable in that the process of monitoring is self-defeating, resulting in a Heisenberg-like uncertainty in the experiment.

The prior art method of transferring performance monitoring data to a secondary memory failed to effectively minimize the perturbation, causing the application behavior to be significantly different from what it would have been without the monitoring.

Figure 1:
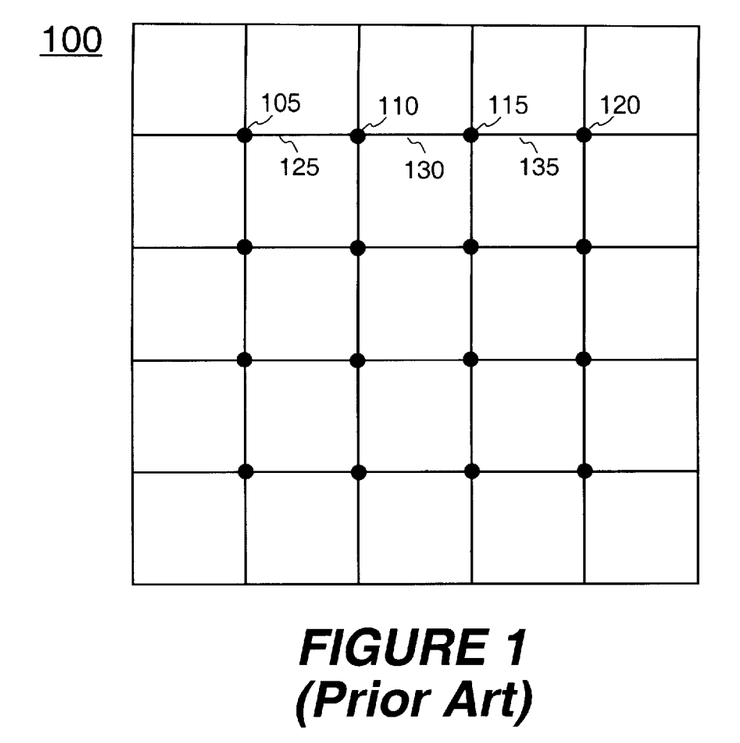
FIG. 1 shows a simplified schematic of a multiprocessor system with a plurality of nodes.
Figure 2:
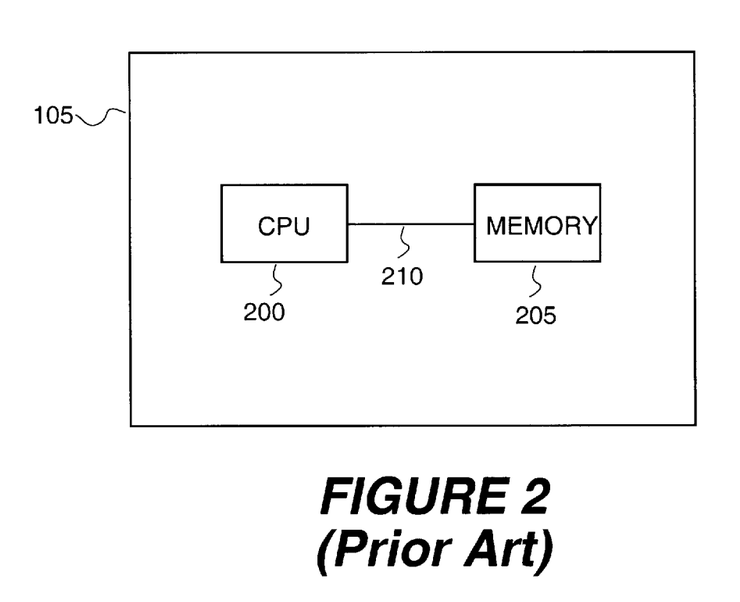
FIG. 2 illustrates a node of the multiprocessor system of FIG. 1.

The prior art method will now be described with reference to FIGS. 1 and 2. FIG. 1 shows a simplified schematic of a multiprocessor system with a plurality of nodes. The multiprocessor system 100 of FIG. 1, includes a plurality of nodes such as node 105, 110, 115, 120. Each node has one or more processors and is connected to one or more other nodes via high speed interconnects, such as interconnects 125, 130, 135. FIG. 2 illustrates a node of the multiprocessor system of FIG. 1. Each node contains one processor such as CPU 200 (or a plurality of processors) connected via a processor memory bus 210 to a corresponding memory 205.

According to the prior art method, when the performance monitoring data buffer on a node, e.g., some part of memory 205 on node 105, is filled, the running of the application is stopped on node 105 and the performance monitoring data is transferred to the secondary memory (not shown). Meanwhile the other nodes, nodes 110, 115, 120, etc. in the system continue to run the application. Once the data has been transferred to the secondary memory, node 105 resumes running the application. This prior art method causes two significant problems.

First, it results in the Heisenberg-like uncertainty referred to earlier. For example, with reference to FIG. 1, node 105 transfers performance monitoring data on link 125 while the other nodes send application related material on link 125. This creates a problem in that because node 105 transfers data on link 125, other nodes in the system cannot use link 125 during the period of time of the transfer of monitoring data to secondary memory by node 105. For example, assume the period of time it takes node 105 to make this transfer is tp. If the application were not being monitored, time tp could be used by the application to transfer data on link 125. When the application is monitored, the use of link 125 for time tp to transfer data causes some message passing events on any node attempting to use link 125 to be delayed by time tp. The Heisenberg-like uncertainty is caused because there is no way to factor tp out of the resulting event trace. A programmer looking at the event trace will incorrectly conclude that this application kept link 125 busy 100% of the time, when in fact tp additional time is really available to the application.

The second problem caused by the prior art method is the skewing in event tracing. Because node 105 stops running the application while other nodes continue to run the application, the operations on node 105 are delayed by a period of time equal to the time period during which the running of the application is halted on node 105. Events on node 105 occur later than they would have without monitoring. Thus, the event tracing gives a chronology of events that is different from what it would have been without the monitoring. According to the event tracing data, events on node 105 occur later than some other events on other nodes. However, were it not for the performance monitoring, those same events on node 105 would have occurred before the aforementioned other events.

It is important to note that a simple shift in time for all events on all nodes would not be of concern so long as the relative time between events is the same as it would have been without tracing (i.e., events x and y occur at 10 and 12 seconds respectively rather than at 5 and 7 seconds, as would have been the case without monitoring). However, the problem caused by the prior art is far more complicated. Specifically, prior art techniques change the relative timing of events (i.e., in the above example, event y would occur before event x). The problem is further aggravated as the initial delay is propagated throughout the system as other operations, which depend on the initially delayed operation, are delayed as well by varying amounts of time. The delay is further compounded with delays caused by the unloading of performance monitoring data from other nodes to the secondary memory. Eventually, as more nodes transfer event trace data to the secondary memory, the event ordering can be significantly skewed. Thus, the application behavior depicted by the resulting event trace bears very little, if any, relation to the chronology of events without monitoring. Again, skewing is not merely a time shifting of all the time stamps by the same amount of time, but a nearly intractable juxtapositioning of the events. Therefore, event tracing that accurately corresponds to the chronology of events without monitoring becomes practically impossible.

The prior art avoided substantially skewing event tracing by only monitoring the application for very short periods of time or by coarse grain sampling (every 1,000 events instead of every event). This minimized the amount of performance monitoring data and consequently the time needed to transfer the performance monitoring data to the secondary memory. However, it failed to allow fine grain monitoring of applications for a relatively long time while minimizing perturbations, and coarse grain sampling cannot always be used to determine application behavior.

The prior art provides two other common approaches to solving the problem of perturbing the application. The first approach involves the use of two inter-node communication facilities (ICFs), one for the application communications and a second for event trace data. The primary disadvantage of this solution is high cost. The hardware necessary for an ICF must be duplicated, doubling the cost of this part of the system. Second, there is no known secondary memory besides the main memory that can operate at high enough bandwidths to capture event trace data for a large parallel computer. Therefore, the application can only be monitored for relatively small periods of time without altering application behavior.

The second approach is to use a cross processor interrupt facility to start and stop the application in lock step. Once a node notices that it needs to move performance monitoring data to a secondary memory, it interrupts all other nodes on the system. Each node then moves its performance monitoring data to the secondary memory while the application is stopped. The same mechanism is used to restart the application. The primary advantage of this approach over the dedicated ICF is that relatively long periods of time can be monitored. This approach is also expensive to build for a large parallel system. Additionally, this type of facility is difficult to partition. If two separate applications are running, each on a portion of the processors, an ideal solution would only stop the processors running the application being monitored. It is not practical to build the hardware support needed to implement the ideal solution. Instead, with the practical hardware support, the cross processor interrupt facility would interrupt all nodes on the system, including those that are not running the application being monitored. This method, therefore, increases interference with other applications running on the system that are not being monitored. For the cross processor interrupt facility, if it is desired to partition the interrupt, it is difficult to know how many times to partition the system. Since a separate wire for each partition of the cross processor facility must be run, a guess that is too high would be expensive since it would cover situations that would never arise. Therefore, it is preferable to guess at a level that covers most situations. Of course, in this case, the system cannot monitor all applications.

Figure 3:
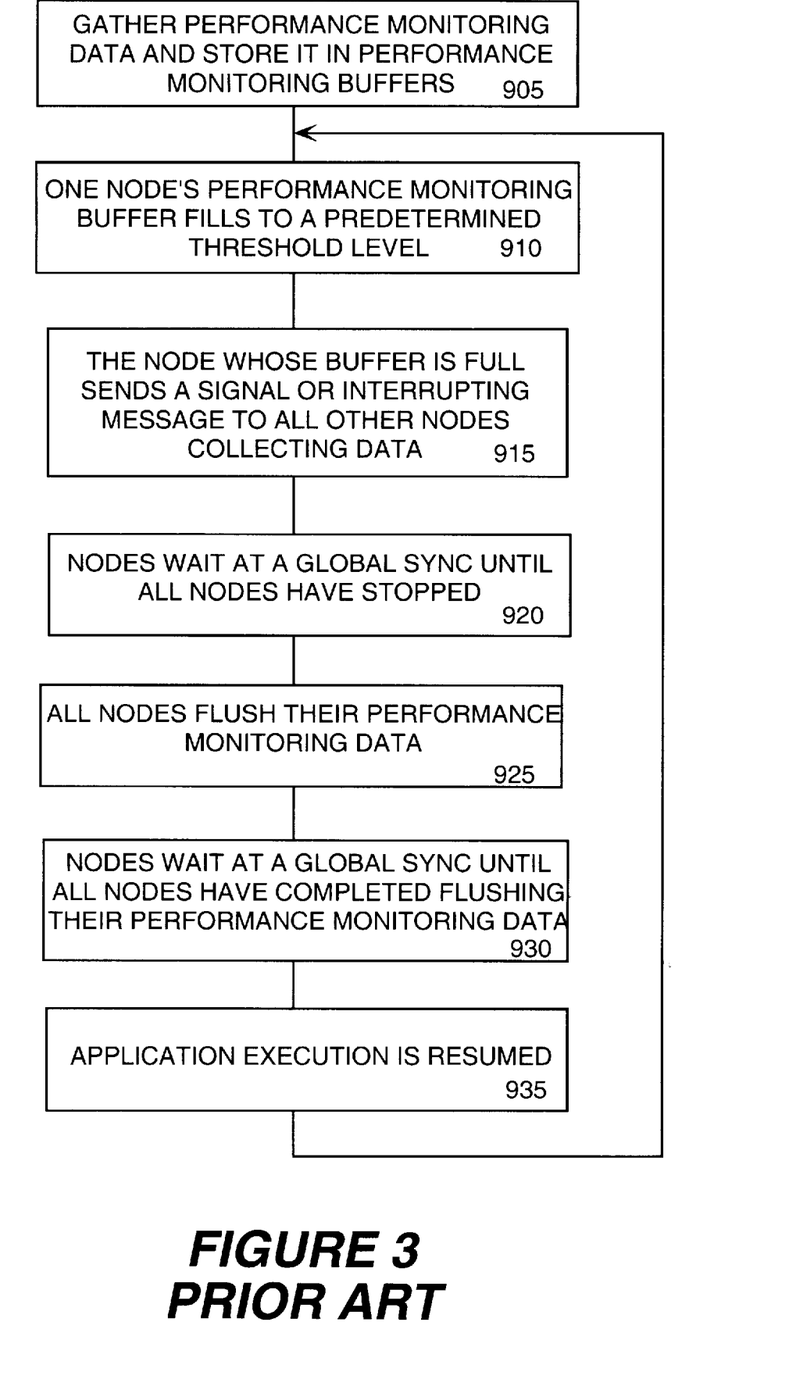
FIG. 3 is a flowchart of the synchronous buffer dump technique used in the Pablo performance monitoring system.

A third prior art approach will now be described with reference to the flow chart of FIG. 3.

The mechanism for implementation is either an interrupting signal (for example, a UNIX signal) or an interrupting message (for example, an Intel Paragon hsend/hrecv). This mechanism allows one node to perform an action that causes the receiving node to stop execution of the code it is running, and branch off to a special handler. This handler can perform actions, and when complete can return to the code the node was running before the interrupt occurred.

As in the method described with reference to FIG. 9, the application is allowed to execute until some node's performance monitoring buffer reaches a threshold. When that occurs, an interrupting message or signal is sent to all other nodes.

To minimize perturbation, the nodes wait at a global synchronization until all nodes have stopped. This is necessary because there is a large amount of skew in when the nodes will receive their stop interrupt.

Once all nodes have stopped, buffers are flushed to secondary storage.

The nodes again wait until all buffers have been written to disk at a global synchronization.

When all nodes reach the synchronization point, the flush is complete and the application is restarted.

However, this approach has several flaws.

First, since a software mechanism is used to stop the nodes, they do not stop at the same time. Since nodes stop out of sync, the chronological order of events is not preserved as some nodes stop immediately, while others continue to execute. This is a result of having no hardware support to interrupt multiple nodes as in both our solution and the crossbar switch solution.

Second, unless the system provides partitionable support for global synchronization, there is also skew as software messages propagate the signal the it is time to restart the application. Because some nodes start sooner than others, the chronological order of events is not preserved.

SUMMARY OF THE INVENTION

It is an object of the present invention to provide a cost effective hardware augmentation which allows capturing performance monitoring data and transferring it to secondary storage while minimizing perturbation of the program execution being studied.

It is another object of the present invention to make the system easily partitionable such that one application can be monitored while minimizing the interference with other parallel applications that are run on the system. Similarly, a thread of a parallel application can be monitored while minimizing the interference with the other threads of the application. A parallel application consists of multiple processes programming on multiple processors. In this connection, a parallel application is: i) an application comprised of multiple threads running on multiple processors (the code on each processor is different);

ii) an application that runs on multiple processors (the code on each processor is the same); or iii) a hybrid of the above where some processors run the same code and some run different code.

These and other objects are accomplished by the present invention. The present invention teaches a novel system and method for minimizing perturbations while monitoring parallel applications. The present invention utilizes a global time clock (GTC) and a global alarm (GA) to synchronize the stop and start time across all the processes running an application. When the GTC time is equal to the GA time, then all the nodes that comprise the monitored application are stopped. During the time when the running of the application being monitored is stopped, performance monitoring data is transferred from the stopped nodes to a secondary memory. Once the transferring of performance monitoring data is completed, the stopped nodes are all restarted at the same time, i.e., when the GTC time is equal to the GA restart time.

BRIEF DESCRIPTION OF THE DRAWINGS

The following drawings are intended to provide a better understanding of the present invention, but they are in no way intended to limit the scope of the invention.

DETAILED DESCRIPTION OF THE INVENTION

The present invention will now be described in more detail with reference to the drawings, which are in no way intended to limit the scope of the present invention.

Figure 4:
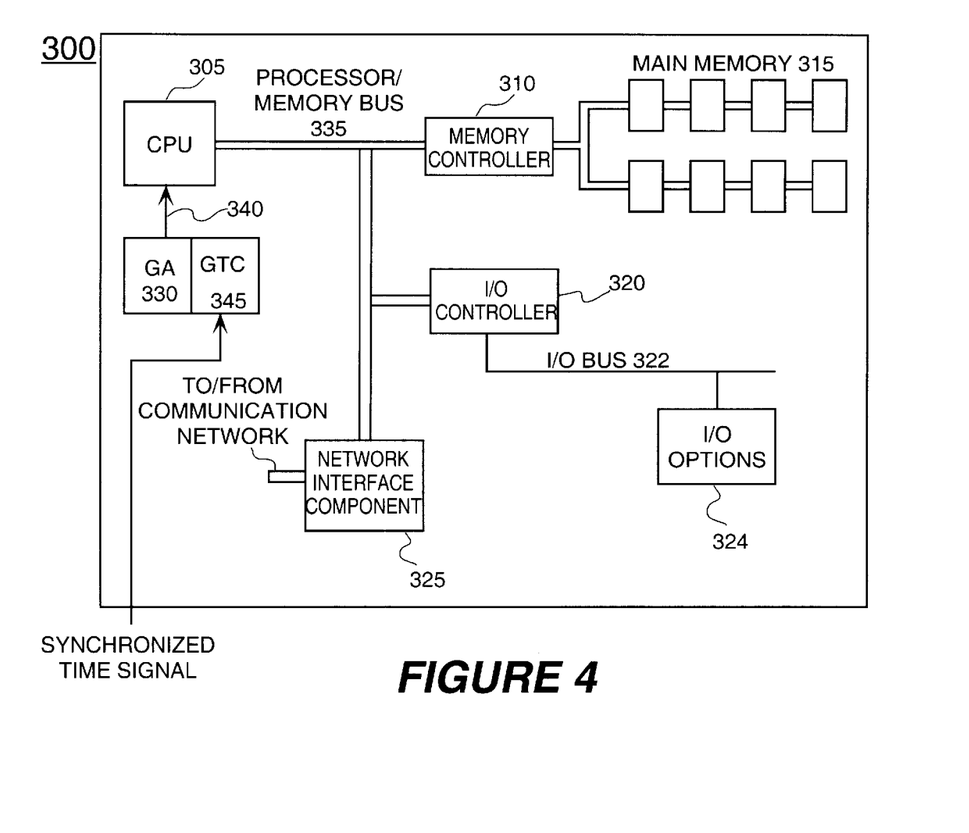
FIG. 4 illustrates one embodiment of a node of the present invention.

FIG. 4 illustrates one embodiment of a node 300 of the present invention. Node 300 contains a CPU (central processing unit) 305, a memory controller 310, a main memory 315, an I/O (input/output) controller 320, an I/O bus 322, I/O options 324, a network interface component 325, a global alarm register (GA) 330, a global alarm interrupt line 340 and a global (GTC) timeclock 345. The CPU 305 is coupled to the memory controller 310 via the processor/memory bus 335. The GA 330 stores a GA time. A low skew, highly synchronized time signal which is available in high performance multiprocessor systems running parallel application drives the GTC. This signal arrives at all nodes in the system within a very short skew tolerance so that all global clocks keep the same time. Although not strictly necessary, the GA and GTC are typically both implemented as a single unit so that there are not two time registers with wires running between them. When the GTC time of the system equals the GA interrupt time, the GA sends an interrupt signal to the CPU 305 along the global alarm interrupt line 340. The CPU then stops running the application transfers the data from the main memory 315 to a secondary memory (not shown). The secondary memory could be a disk drive connected to each node's I/O controller.

Additionally, the processors could be connected via a shared bus and share local I/O FIG. 4. Alternatively, the processors could be connected via some network or interprocessor communication facility so that the processors are connected via a specialized high speed network and only some have I/O.

The CPU initiates the transfer of the performance data to secondary storage through commands to the I/O controller or the network interface component 325 depending on whether the data is transferred to remote or local I/O devices. The GA is then set to a start time, the GA start time. When the GTC time equals the GA start time, the GA sends an interrupt to the CPU causing it to restart the application.

It is important to note that all the nodes running a particular application stop and start at the same time, since all the nodes running the same application store the same GA interrupt and restart time and are synchronized by the same GTC which is universal for the entire system. It is also important to note that only the nodes running the monitored application are stopped while other nodes running other applications continue to run uninterrupted. This avoids interfering with other applications running on the system. In fact, even one thread of a parallel multi threaded application can be monitored without interfering with the other threads of the application. This is accomplished by treating each thread of the application as if it were an independent application.

The foregoing description is for a multi-processor node, where the number of threads equals the number of processors. If there are a larger number of threads than processors, there will be a perturbation effect. However, the case where the number of processors is equal to the number of threads is an important special case. In this special case, all threads of an application can run in parallel. Application architecture is often optimized for this special case, so it is important to be able to monitor it with minimum perturbation.

Stopping the application on all the nodes running the application at the same time, transferring monitoring data from the nodes to the secondary memory and restarting the running of the application on all the nodes running the application at the same time substantially minimizes perturbation caused by performance monitoring. First, it minimizes the Heisenberg-like uncertainty referred to earlier since the application is not run when the performance monitoring data is transferred to the secondary memory. Second, the above method essentially eliminates the possibility of producing an event trace that has a chronology of events that is different from what the chronology of events would have been without performance monitoring. It introduces a delay. However, since the same delay is introduced on all nodes the net effect is only a shift in the time stamps. Thus all the time stamps are delayed by the same amount of time. Consequently, the relative position on a time scale of the events is the same as it would have been without monitoring. There is no skewing the time stamps with longer monitoring periods. This allows monitoring the performance of the application for longer periods of time. It does not, unlike the prior art method, only allow monitoring the performance for a relatively short period of time or at coarse grain sampling.

Figure 5:
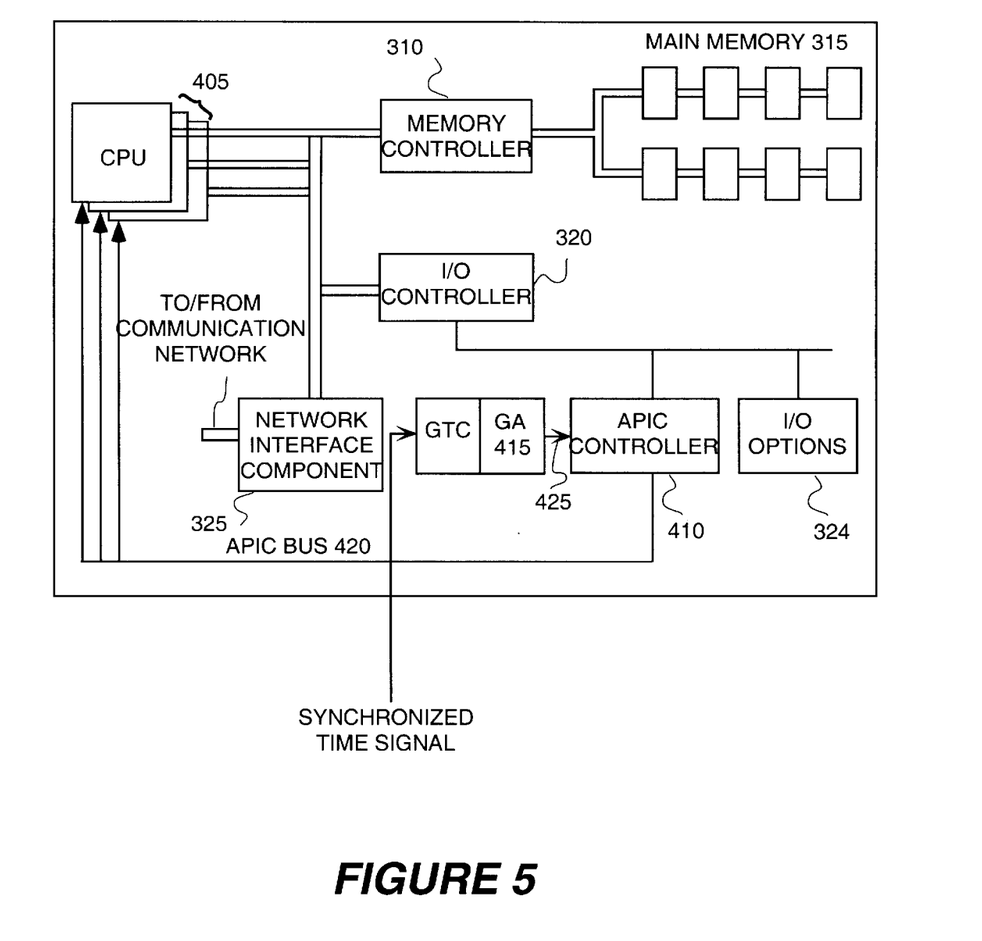
FIG. 5 illustrates a second embodiment of a node of the present invention.

FIG. 5 illustrates a second embodiment of a node of the present invention. The node in FIG. 5, in addition to the elements of the node in FIG. 4, contains a plurality of CPUs 405 instead of only one. Therefore, the node represented in FIG. 5 is a multiprocessor node. Furthermore, the node illustrated in FIG. 5 has an APIC (Advanced Programmable Interrupt Controller) 410 coupled to the global alarm (GA) 415 by a global alarm interrupt line 425. Each processor has a corresponding GA interrupt time, i.e., each processor wants to be stopped or started at a certain time. Although there are multiple processors on the node, there is only one copy of the operating system shared by all processors. A request to set the GA is made to the operating system. The operating system chooses which time is closest by comparing them and choosing the earliest. If necessary, it also programs the APIC so the correct processor is interrupted.

For a parallel application of this type, event tracing is used as a tool to help the programmer overlap operations and redistribute work so that nodes have equal amounts of work, or can hide communication or I/O operations behind computations.

With this method, not only is the chronology of the events being monitored shifted, the work the application is doing is also shifted, preserving the relationship of useful work by the application to the events being recorded.

The GA register needs to be "close" to the global clock so the values can be prefaced. FIG. 5 shows the two components as a single global clock/global alarm 415. Thus, for example, if one processor wants to stop the application five seconds hence and another processor wants its application stopped three seconds hence, while yet a third processor wants to stop its application one second hence, the one second from hence time will be stored in the GA register as the next time for interrupt. When the GTC time equals the GA interrupt time, the GA 415 sends an interrupt signal to the APIC 410 via the global alarm interrupt line 425. The APIC then sends an interrupt signal to the CPUs along the APIC bus 420. Each CPU is connected to the APIC 410 via a separate branch of the APIC bus 420.

As previously noted, APIC 410 is a programmable interrupt controller. Devices that want to generate interrupts are connected to the interrupt request lines of the APIC. Processors that want to receive interrupts are connected to the processor interrupt lines.

When the operating system boots, one of its tasks is to program the APIC. Each interrupt request line can be programmed separately to interrupt a specific processor, or all processors, or some combination.

In normal operation the APIC would be programmed to interrupt only the processors containing code to be event traced.

It should be noted that this it not a requirement. In a symmetric multiprocessor arrangement, one could have only one processor interrupted by the clock interrupt, and have it interrupt the other processors using an inter-processor interrupt. Although this adds slightly more skew to the time when the secondary processors stop, it could be made to work. Thus, the invention does not require a programmable interrupt controller. However, if an APIC is present the implementation could be simplified.

In any computer system where more than one interrupt can occur, an interrupt controller is always present. Interrupts are given different priorities and a low priority interrupt is never allowed to interrupt a higher priority interrupt. Likewise, when servicing a low priority interrupt, if a higher one occurs, the processor is interrupted and control passed to the higher priority interrupt. The interrupt controller provides all the control for priority interrupts to work.

Figure 6:
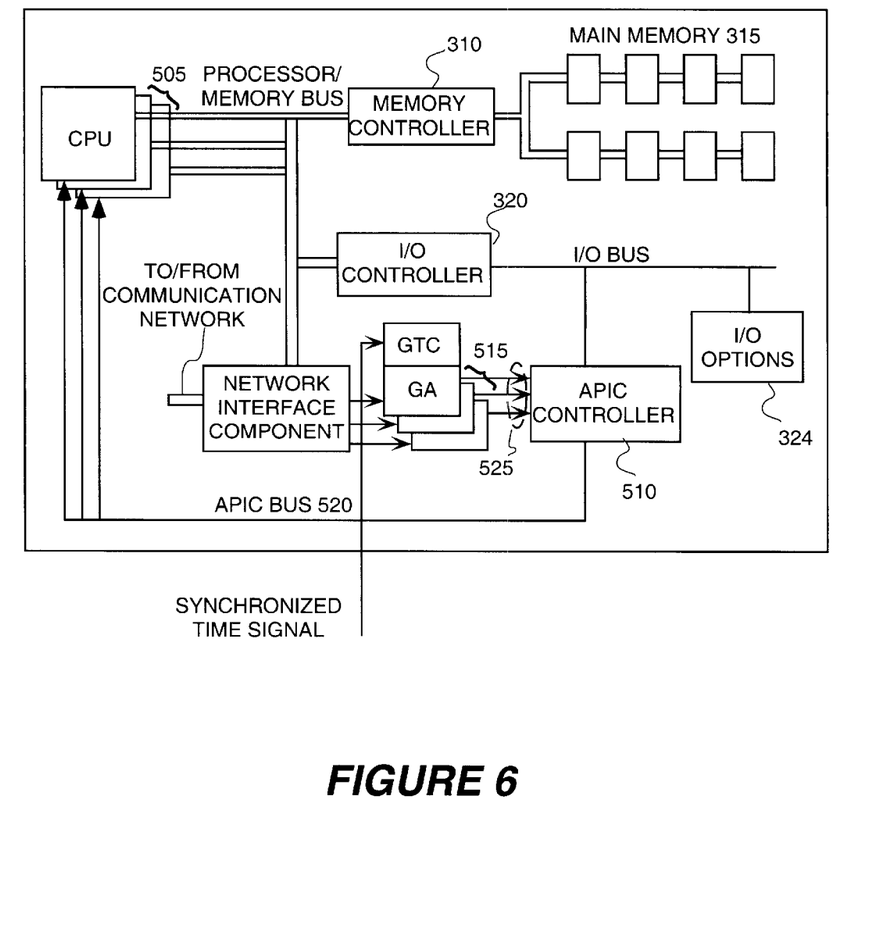
FIG. 6 illustrates a third embodiment of a node of the present invention.

The problem of deciding which GA interrupt time to use is avoided with the node described in FIG. 6, which is the preferred embodiment of the present invention. The node illustrated in FIG. 6, like that of FIG. 5 has a plurality of CPUs 505 and an APIC 510. However, unlike the node in FIG. 5, the node illustrated in FIG. 6 also has a plurality of global alarms (GA's) 515 and a plurality of global alarm interrupt lines 525, instead of only one. Each GA corresponds to a CPU and stores the GA interrupt time for the application running on its corresponding CPU. When the GTC time equals the GA interrupt time in one of the global alarms, the GA sends an interrupt signal to the APIC controller via the global alarm interrupt line coupled to GA. The APIC 510 then sends an interrupt signal to the CPUs along the APIC bus 520. As is the case in FIG. 5, each CPU in FIG. 6 is connected to the APIC controller via a separate branch of the APIC bus 520.

Figure 7:
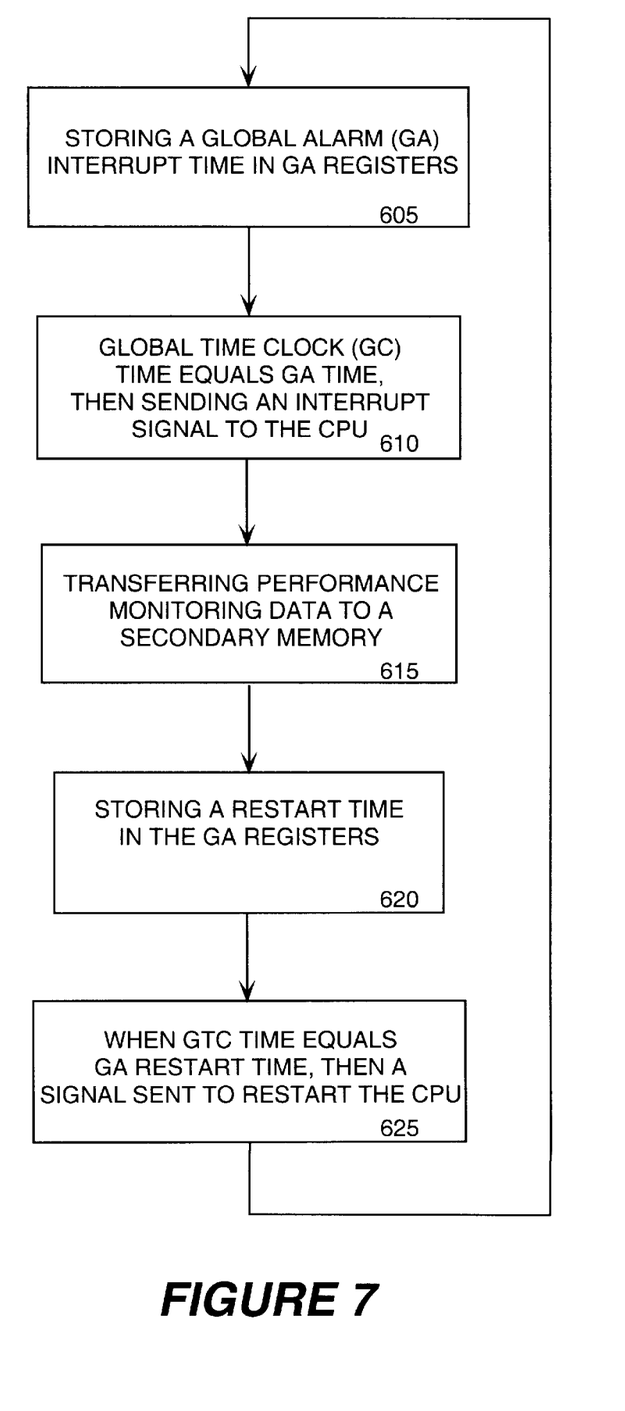
FIG. 7 is a flowchart diagramming the general method of the present invention.

FIG. 7 is a flowchart diagramming the general method for transferring performance data to a secondary memory. First, a global alarm (GA) interrupt time is stored in the GA interrupt register of all the nodes running the application (step 605). The operating system, as part of the process of readying an application, reads the GA interrupts associated with the application and stores the GA interrupt times in the GA registers of nodes that run the application. When the global time clock (GTC) time equals the GA interrupt time, an interrupt signal is sent to the CPU (step 610).

Subsequently, all the nodes which have been interrupted transfer their performance monitoring data to the secondary memory (step 615). In the meantime, a restart time is stored in the global alarm registers (step 620). When the GTC time equals the GA restart time, all the interrupted CPUs are restarted again so as to run the application (step 625). Stopping and starting the running of the application is synchronized across all nodes running the application. Therefore, the application is simultaneously stopped on all the nodes running the application and it is also substantially simultaneously started on all the nodes running the application. This minimizes the perturbation of the application and the skewing of the chronology of events. Moreover, it makes more effective use of the time during which the application is stopped by transferring performance monitoring data from all the nodes running the application to the secondary system instead of only downloading data only from a node whose performance monitoring data buffer is full.

Figure 8:
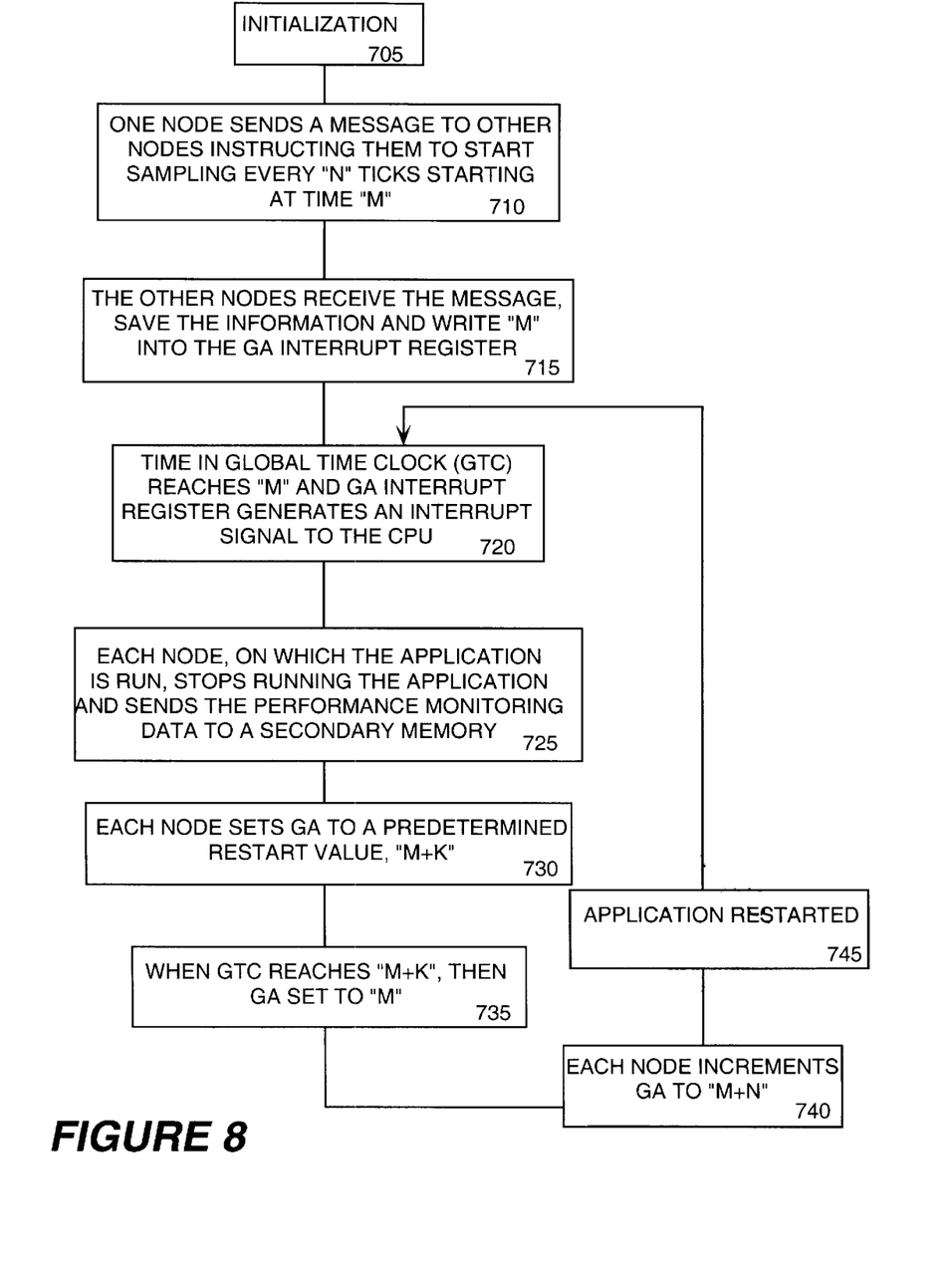
FIG. 8 is a flowchart diagramming one example of the method of the present invention.

The following figures provide, in greater detail, alternative methods for setting the global alarm interrupt and restart time. FIG. 8 is a flowchart diagramming one example of the method of the present invention. This method is preferably used when the performance monitoring generates a very large amount of performance monitoring data. In step 705, the list of nodes to be monitored, the value for "n", the value for "m", the list of performance data to be sampled in step 725, and the value of "k" are initialized. One node sends a message to the other nodes running the application instructing them to start sampling (i.e. send performance monitoring data to the secondary memory) every "n" ticks starting at time m (step 710). The other nodes receive the message, save the information and write "m" into the GA register (step 715). When the GTC time reaches "m" the GA generates an interrupt signal to the CPU (step 720). It is important to note that this occurs at the same time on every node running the application since the GTC is synchronized across all the nodes on the system. Next, each node stops running the application and sends the performance monitoring data to the secondary memory (step 725). Then, each node sets the GA to a predetermined restart value "m+k", where "k" is a sufficient amount of time for unloading the performance monitoring data from the nodes to the secondary memory (step 730). When the GTC reaches the restart time, "m+k", then the GA on each node is set to "m" (step 735). In the following step, each GA increments the GA register time to "m+n", which is used as the GA interrupt time for interrupting the application in the next cycle (step 740). After incrementing the GA register time, the application is restarted (step 745). It is important to note that "m" is an absolute time as counted by the GTC and that "m" has the same number of bits of precision as the GTC. On the other hand, "n" and "k" are time increments, rather than absolute times, The reason this is important is because every processor usually takes a different amount of time to perform the dump of data and to service the interrupts. Because n and k are relative, the operation is self-synchronizing. However, they also have the same number of precision bits as the GTC. Finally, "m", "n", and "k" can take on a very wide range of values and are presented only for illustrative purposes.

Figure 9:
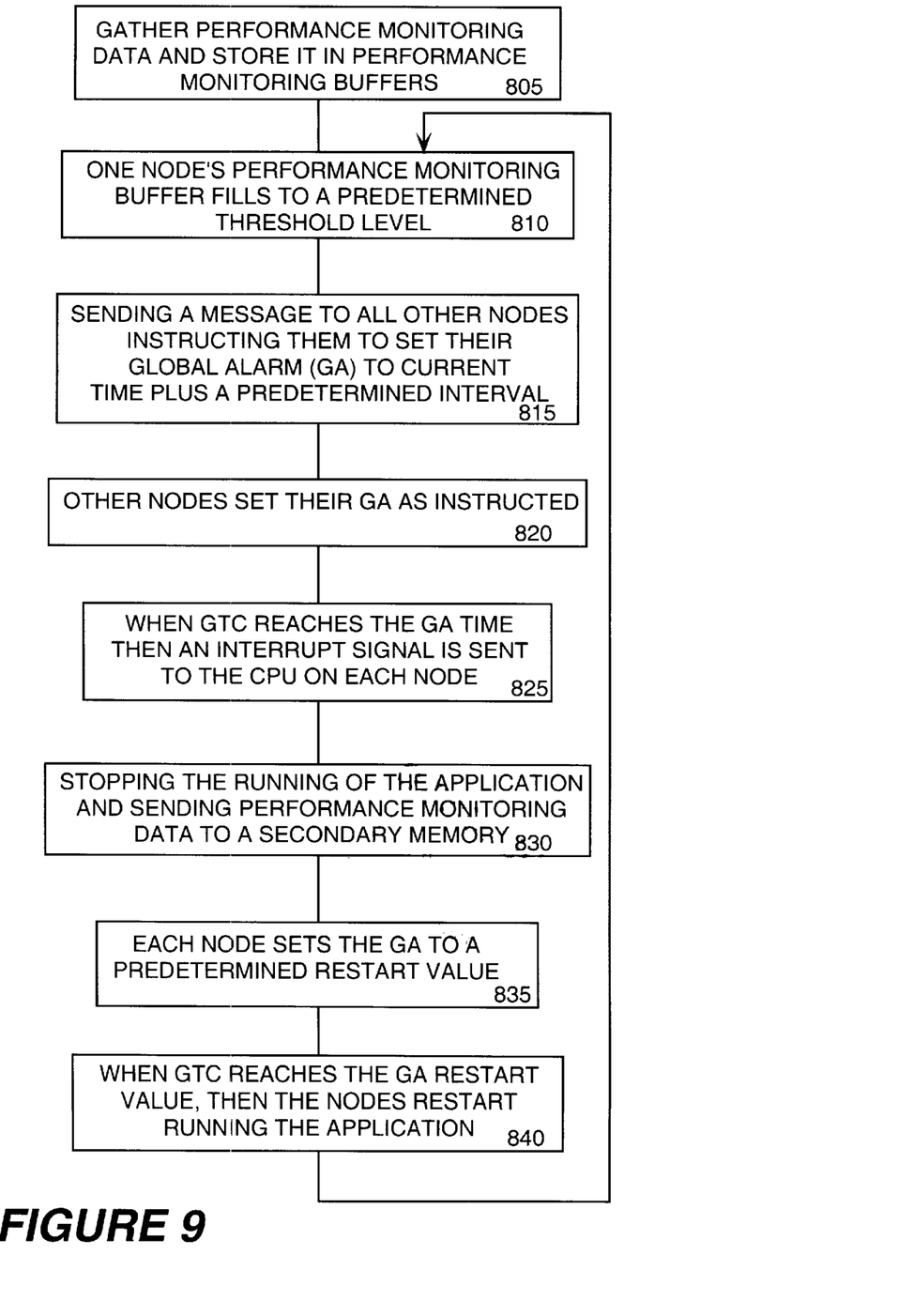
FIG. 9 is a flowchart diagramming a second example of the method of the present invention.

FIG. 9 is a flowchart diagramming a second example of the method of the present invention. This method is preferably used when the performance monitoring does not generate a substantial amount of performance monitoring data. Initially, the nodes are gathering performance monitoring data, which they store in performance monitoring buffers (step 805). When one node's performance monitoring buffer fills to a predetermined threshold level (e.g., half the buffer storage capacity) (step 810), then that node sends a message to all the other nodes running the application (step 815). The message instructs the other nodes to set the GA to the current time plus a predetermined interval, which is the time needed for all the other nodes to set their GA. Then, the other nodes set their GA as they were instructed (step 820). When the GTC reaches the GA time, an interrupt signal is sent to the CPU on each node (step 825). Each node then stops running the application and transfers the performance monitoring data from the performance monitoring data buffer to the secondary memory (step 830). Each node then sets the GA to a restart value, which is equal to the stop time plus an interval sufficient for off loading the performance data to the secondary memory (step 835). When the GTC reaches the GA restart time, the node resume running the application (step 840). The above example was described for the case where the predetermined threshold level is one half the buffer storage capacity. As is obvious to one of ordinary skill in the art, the predetermined threshold level need not be equal to half the buffer storage capacity, but can take on a very wide range of numbers.

The above description provides details of the preferred embodiment of the present invention. It is of course apparent that the present invention is not limited to the detailed description set forth above. Various changes and modifications of this invention as described will be apparent to those skilled in the art without departing from the spirit and scope of this invention as defined in the following claims.

What is claimed is:

1. A multiprocessor system including a plurality of nodes wherein each node comprises a processor;

memory coupled to the processor for storing data;

a global alarm register coupled to said processor, wherein said global alarm register stores a predetermined time; and a global alarm interrupt line coupled to said processor and said global alarm register, an alarm interrupt signal being generated on said global alarm interrupt line when a global time from a global time clock matches said predetermined time to interrupt said processor without stopping said global time clock and cause the transfer of data from the memory to a second memory, wherein each node in response to the memory being filled to a threshold level notifies at least one other node of said plurality of nodes to set a global alarm register of said other node to a current global time plus a predetermined interval.

2. The multiprocessor system of claim 1 further comprising an advanced programmable interrupt controller coupled to said global alarm register and to the processor.

3. The multiprocessor system of claim 2, wherein each node comprises a plurality of processors and one global alarm and further wherein each of said plurality of processors is coupled to the advanced programmable interrupt controller via an advanced programmable interrupt controller bus line.

4. The multiprocessor system of claim 2, wherein each node comprises a plurality of processors and a plurality of global alarms, coupled to the advanced programmable interrupt controller by a plurality of global alarm interrupt lines, such that each one of said plurality of global alarms corresponds to only one of said plurality of processors and is coupled to the advanced programmable interrupt controller via a separate global alarm interrupt line, further wherein each of said plurality of processors is coupled to the advanced programmable interrupt controller via an advanced programmable interrupt bus line.

5. A method of minimizing perturbations while monitoring parallel applications comprising the steps of:

initializing nodes within a multiprocessor system;

sending a message from one node to other nodes within the system, wherein according to said message all nodes are to start sampling every n ticks starting at time m;

the other nodes receiving said message, saving the information and writing m into a corresponding global alarm register;

each global alarm register generating an interrupt to a processor on the node when time in a global time clock reaches m;

the processors stopping running an application and sending performance monitoring data to a secondary memory;

each node setting its corresponding global alarm register to a restart time m+k, wherein k is a predetermined time which is sufficient for unloading performance monitoring data;

setting each global alarm register to m when time in a global time clock reaches m+k;

incrementing each global alarm register from m to m+n; and restarting running the application.

6. A method of minimizing perturbations while monitoring a parallel application comprising the steps of:

sending a message from one node to other nodes in a system running said parallel application when a performance monitoring data buffer of said one node fills to a predetermined threshold level, wherein by said message, said one node instructs said other nodes to set a global alarm register within each of said nodes to a current time plus a pre-determined time interval;

the other nodes setting their global alarm registers to the current time plus the pre-determined time interval;

the nodes running the application interrupting the running of the application when global time clock reaches a stop time stored in the global alarm register;

the nodes sending performance monitoring data from their performance monitoring data buffers to a secondary memory;

setting the global alarm registers to a predetermined restart value, which is the stop time plus an interval sufficient for flushing their performance monitoring data buffers; and restarting running the application when the global time clock reaches the predetermined restart value.

7. A multiprocessor system comprising a plurality of nodes and a global time clock providing a global time, wherein each node comprises a processor;

storage means coupled to the processor for storing processor data;

means for storing a predetermined time and generating an interrupt signal; and means for transferring an interrupt signal such that said means for storing a predetermined time and generating an interrupt signal sends an interrupt signal to said processor without stopping the global time clock along said means fir transferring an interrupt signal when said predetermined time matches a global time and causes the transfer of data from the storage means to a secondary memory, wherein each node is configured to notify at least one other node of said plurality of nodes to load a means for storing a predetermined time and generating an interrupt of the other node with a predetermined time m.

8. The multiprocessor system of claim 7 further comprising an advanced programmable interrupt controller coupled to said means for storing a predetermined time and generating an interrupt signal and to said processor.

9. The multiprocessor system of claim 8, wherein each node comprises a plurality of processors and one of said means of storing a predetermined time and generating an interrupt signal and further wherein each of said plurality of processors is coupled to the advanced programmable interrupt controller via an advanced programmable interrupt bus line.

10. The multiprocessor system of claim 8, wherein each node comprises a plurality of processors and a plurality of means for storing a predetermined time and generating an interrupt signal, coupled to the advanced programmable interrupt controller by a plurality of means for transferring an interrupt signal, such that each one of said plurality of means for storing a predetermined time and generating an interrupt signal corresponds to only one of said plurality of processors and is coupled to the advanced programmable interrupt controller via a separate means for transferring an interrupt signal, further wherein each of said plurality of processors is coupled to the APIC controller via an APIC bus line.

11. The multiprocessor system of claim 10, further comprising in each node an I/O controller being an interface to the secondary memory.

12. A method comprising:

simultaneously stopping a plurality of nodes which are executing an application on a multiprocessor system, each node having at least one processor and memory and being stopped in response to the contents of an alarm register in each node being equal to a global time clock of the system;

transferring data from the memory of each node to a secondary storage while the global time clock continues to run; and simultaneously restarting the plurality of nodes to continue executing the application in response to the global time clock reaching a restart time stored in the global alarm register of each node.

13. A multiprocessor system according to claim 1 wherein a first set of the plurality of nodes continue to execute a first application while a second set of the plurality of nodes stop executing a second application in response to the alarm interrupt signal being generated in each of the second set of nodes.

* * * * *